United States Patent Office 3,684,525
Patented Aug. 15, 1972

3,684,525
METHOD OF PRODUCING PASTRY FROM DOUGHS OF LOW WATER CONTENT
Ernstgeorg Albert Hanssen, Hannover, Germany, assignor to Werner Bahlsen, Hannover, Germany
No Drawing. Filed Feb. 9, 1970, Ser. No. 10,014
Claims priority, application Germany, Feb. 12, 1969, P 19 06 930.8
Int. Cl. A21d 8/04, 13/08
U.S. Cl. 99—92
3 Claims

ABSTRACT OF THE DISCLOSURE

Pastry is manufactured from doughs of 12 to 18% water content using osmophile yeast as the principal raising agent.

---

The invention described in this application concerns a process for producing pastry from doughs of low water content, in particular from biscuit doughs.

As a rule, biscuit doughs contain very little moisture. A generally accepted rule of thumb says that the moisture content of such doughs varies between 12 and 18 percent. In the past, this low moisture content stood in the way of using as raising agents for baking biscuits the usual baking yeasts which, for taking effect, require a much higher moisture content of the dough.

That is why the practice of baking biscuits has so far been to use chemical raising agents, such as hartshorn salt or a mixture of bicarbonate of soda with tartaric acid.

The production of foodstuffs is governed by a growing trend, drastically supported by legislation, to keep foodstuffs free, as far as possible, from foreign matter. That is the point where the invention described herein should be particularly welcome, since it allows doing without the usual share of raising agents of inorganic or organic origin in preparing a number of durable pastry goods.

During the research which led to the invention described herein, scientists were surprised to find that a number of yeasts which had so far been considered as defective yeasts because, when used in producing marzipan goods liqueur chocolates etc., they caused the manufactured products to burst, are extremely well suited to raise doughs of low moisture content and help in the production of pastry of exceptionally high quality. These yeasts, so far considered as liable to cause defects, are the so-called osmotolerant or osmophile yeasts it has been possible to breed a variety of yeast strains which had so far only been known for their capability of remaining active even in material of high sugar concentration, such as it is used in processed marzipan or in liquid fillings of liqueur chocolates.

A typical strain of yeast suited for the baking of biscuit doughs is the *Saccharomyces rouxii* known as a defective yeast in the production of marzipan. Other typical yeast strains are:

*Saccharomyces rosei*
*Saccharomyces heterogenicus*
*Saccharomyces steineri*
*Saccharomyces colliculosa*
*Saccharomyces uvarum.*

So it came quite as a surprise to the baking specialist to find that these yeasts are suited for improving the texture of a relatively very dry and firm dough. These yeast strains were found to be able to survive and retain their vitality in dry surroundings and to start and develop fermentation at a rate sufficient to expand such doughs and to favourably improve the quality, in particular the taste, of the end-product of the pastry.

The osmotolerant yeasts, to be added in the process described herein, may be bred on molasses and may be distributed in this form to biscuit manufacturers.

These yeasts are employed in much the same way as other baking yeasts. That is to say: the yeast is added, for preliminary rising, to a certain amount of dough, which may have a slightly higher moisture content of up to 50 percent. This first dough is kept for half an hour at a temperature of around 30° C.

For mixing the first dough with the main dough the ideal ratio is 1:3, so that roughly 25 percent of the final dough consists of first dough which has undergone preliminary rising. In preparing the main dough due account should be given to the slightly higher water content of the first dough, so that the final mix of main dough and first dough has the desired average moisture percentage.

The main dough, to which the first dough has been added, should be kept roughly 60 minutes at around 30° C. During this period the dough should be worked in the usual way.

After this treatment the dough is ready for being portioned, i.e. for being cut into the desired forms and may then be baked in the usual way.

However, it is also convenient to have the cut pieces undergo single fermentation before baking: The pieces of biscuit dough cut to the desired form are kept for some 20 minutes at around 30° C. before being put into the oven.

Baking takes place in a continuous oven at the usual temperatures. Experience has shown that for baking crisp dry biscuits the ideal temperature is around 290° C. heat from above and about 310° C. heat from below.

The pastry goods prepared in accordance with the process herein described show the following advantages:

(1) constant baking volume
(2) exquisite taste not influenced by the "alkaline" taste of known raising agent residues,
(3) appetizing brown colour,
(4) no blistering on bottom side of pastry,
(5) increased break resistance.

These properties are essential for the mechanical packaging of biscuits, in view of the need to maintain a constant baking output volume, unchanged throughout the baking process, to allow the packaging of always the same number of biscuits in a given container or box in such way as to prevent the biscuits from rubbing against each other and against the walls and partitions of the box, preventing abrasion and discolouration of the biscuits, and thus ensuring an exceptionally high resistance to breaking of the packaged biscuits during their transport.

The process described above has also proved useful in the preparation of doughs for short pastry and gingerbread.

I claim:

1. In the process of manufacturing pastry by mixing a dough having a moisture content between about 12 and 18 percent and a yeast, raising the mixture, working the mixture to a desired shape and size and heating to bake, the improvement comprising mixing with the other dough ingredients osmophile yeast as the principal raising agent.

2. The process of claim 1 wherein the osmophile yeast utilized as raising agent is selected from the group consisting of *Saccharomyces rouxii* strains.

3. The process of claim 1 wherein the rising agent is mixed with a first dough having a moisture content of not over 50 percent, the mixture of first dough and raising agent is kept at 30° C. for about a half hour for a preliminary rising thereof and said mixture is then mixed with a main dough having a lower moisture content than the first dough in an amount such that about 25 percent of the thus formed final dough consists of first dough which has undergone preliminary rising, said final dough having a moisture content between about 12 and 18 percent.

References Cited

The Baker's Digest, vol. 43, No. 2, April 1969, pp. 37–38.

RAYMOND N. JONES, Primary Examiner

J. R. HOFFMAN, Assistant Examiner

U.S. Cl. X.R.

99—90 R, 96